US005458802A

United States Patent [19]

Sanderson et al.

[11] Patent Number: 5,458,802
[45] Date of Patent: Oct. 17, 1995

[54] LIQUID BLEACH AND DETERGENT COMPOSITIONS

[75] Inventors: William R. Sanderson, Penketh; John D. Wharne, Halton Village, both of England

[73] Assignee: Solvay Interox Limited, Warrington, England

[21] Appl. No.: 103,301

[22] Filed: Apr. 12, 1993

[30] Foreign Application Priority Data

Apr. 10, 1993 [GB] United Kingdom .................. 9207981

[51] Int. Cl.$^6$ .................................................. C01B 15/043

[52] U.S. Cl. ................................ 252/186.31; 252/186.3; 252/186.32; 252/186.42; 252/186.38; 252/95

[58] Field of Search ........................ 252/186.27, 186.30, 252/186.31, 186.32, 186.42, 186.38

[56] References Cited

U.S. PATENT DOCUMENTS

| | | | |
|---|---|---|---|
| 2,491,789 | 12/1949 | Young | 252/186.27 |
| 4,772,412 | 9/1988 | Green et al. | 252/96 |
| 4,891,147 | 1/1990 | Gray et al. | 252/104 |
| 4,931,195 | 6/1990 | Cao et al. | 252/8.8 |
| 4,988,462 | 1/1991 | Schepers et al. | 252/174.22 |

*Primary Examiner*—Gary L. Geist
*Assistant Examiner*—Joseph D. Anthony
*Attorney, Agent, or Firm*—Larson and Taylor

[57] ABSTRACT

Liquid compositions containing a perborate bleaching system having improved chemical stability over existing systems are prepared by suspending a salt of a superperborate in a non-aqueous liquid. The superperborate salts have an available oxygen content of greater than 16.1%, and an empirical chemical formula of the type $Na_xB_yO_z.nH_2O$ where x is 1–4, y is 1–5, z is 2–15 and n is 1–5. The ratio of x:y is between 0.5 to 1.2:1. The compositions may include surfactants, activators and detergent auxiliaries. Preferred surfactants are nonionic surfactants. When a surfactant is present, the compositions are bleach containing liquid detergents. When surfactants are not present, the compositions can be used as bleach additives or non-detergent cleaners.

23 Claims, No Drawings

LIQUID BLEACH AND DETERGENT COMPOSITIONS

This invention concerns liquid bleach and detergent compositions. More specifically, this invention concerns liquid bleach and detergent compositions which contain peroxygen-based bleaching systems.

In recent years the production and sales of liquid detergent compositions have increased dramatically. This is believed to be because the use of liquid detergents offers advantages to both consumer and producer. The user has, for example, the advantage of convenience of dosing, and the more rapid dispersal of liquid systems, compared to traditional powder products, which can lead to shorter washing times or improved washing in a given period. The manufacturer has the advantage of lower production costs as the production of liquid compositions avoids energy-intensive stages associated with the production of traditional powder products, for example, spray-drying.

It is desirable to utilise a bleach in conjunction with detergent compositions to improve the removal of household stains, for example, tea. The presence of a bleaching system is a feature of the majority of European solid detergent compositions. Bleaching agents commonly used in solid detergent compositions include persalts, for example, sodium perborate monohydrate, sodium perborate tetrahydrate, or persalts plus activator systems.

Perborate bleaching systems can either be included directly into a liquid detergent, or can be formulated into a non-detergent liquid for separate dosing together with a detergent composition. Direct formulation into the detergent is preferred as it avoids additional dosing, but formulation into a separate "bleach additive" may be necessary if, for example, the detergent formulation contains a component which is known to be incompatible with perborates. The perborate is often incorporated into liquid compositions as a solid suspended in the liquid as this improves the chemical stability of the perborate.

For a bleaching system to be successfully included in a liquid detergent or bleach additive formulation, it is necessary for the bleaching system to be chemically and physically stable in the formulation. The more stable the bleaching system, the longer the storage life of the product. A more stable bleaching system also means that lower levels of bleach are needed to provide a given activity after a period of storage, which means the composition can be produced more economically. Sodium perborate mono- and tetrahydrates have been shown to be physically stable in liquid compositions, but the rate of chemical decomposition is faster than desired.

It is an objective of this invention to provide a liquid composition containing a perborate bleaching system with improved chemical stability compared to perborate-containing liquid systems previously available.

According to the present invention, there is provided a liquid composition containing a bleaching system having improved chemical stability characterised in that it comprises a suspension of an alkali metal salt of a superperborate with an available oxygen content of greater than 16.1% by weight in a substantially non-aqueous liquid which may comprise one or more surfactants.

According to another aspect, the invention provides a cleansing method wherein that which is to be cleansed is contacted with a liquid composition containing a suspension of an alkali metal salt of a superperborate, optionally in diluted form.

A further aspect of the invention provides for a method of preparing compositions wherein a superperborate salt as hereinbefore described is dispersed in a non-aqueous liquid by stirring or other means of agitation.

The superperborates utilised in the invention are defined by having an available oxygen (Avox) content of greater than 16.1%, preferably an Avox of between 16.5 and 30%, more preferably between 17 and 25%. Many superperborates have an empirical chemical formula of the type $Na_xB_yO_z.nH_2O$ where x, y, z, and n represent the number of moles of the respective elements in the molecular formula. The ratio of x:y is in many instances in the range from about 0.5 to about 1.2:1, and is often 1:1. The value of x often lies in the range from 1 to 4, the value of y often lies in the range from 1 to 5, the value of z often lies in the range from 2 to 15 and the value of n often lies in the range from 1 to 5. The ratio of Avox to y is greater than 1:1, and in many instances is from about 1.1 to about 1.6:1.

They can be prepared by the methods disclosed by Partington and Fathallah (Nature, 164, p952; Journal of the Chemical Society, 1949, p3420) or by the process disclosed in European patent No. 192124.

Compositions according to the invention often contain from about 0.5% to about 50% w/w of superperborate, preferably from about 2% to about 30%, the actual amounts used being chosen at the discretion of the formulator to meet the needs of the desired application.

The substantially non-aqueous liquid can comprise one or more water-miscible substantially water-free compounds, or a solution of a solid component in such a compound which is pourable at normal storage and use temperatures, i.e. at above 10° C., and preferably below 0° C. The choice of the composition of the substantially non-aqueous liquid will often take into account considerations of, for example, product appearance or viscosity, and control of the physical stability of any particulate component.

The non-aqueous liquids which may be employed in this invention are often conveniently selected from the group comprising alcohols, polyols, amines, low molecular weight ether or ester derivatives of alcohols or polyols, or liquid polyglycols or surfactants and mixtures thereof.

Usable alcohols include $C_2$ to $C_6$ linear or, where structurally permissible, branched alcohols including ethanol, propanol, isopropanol, butanol and hexanol. Polyols can be diols, as in ethylene glycol, propylene glycol or polymers thereof in a molecular weight for polyoxyethylene glycol especially of up to 500 and for polyoxypropylene glycol of up to 4000. Alternatively the polyol can be trihydric such as glycerol. Typically the polyol monomer contains up to 6 carbon atoms.

Usable low molecular weight ether derivatives include $C_1$ to $C_4$ alkyl (linear or branched) ethers derived from the aforementioned alcohols or polyols and in many instances are derivatives of a glycol or a di- or tri-glycol, such as monoethyl ethers of ethylene glycol or triethylene glycol, or tripropylene glycol, the monopropyl or monobutyl ether of ethylene glycol or diethylene glycol and the monobutyl ether of dibutylene glycol.

Suitable esters include mono, di and tri acetates of glycerol, digol monoacetate, dipropylene glycol mono or diacetate and ethylene glycol acetate.

A useful class comprises alkanolamines, often containing up to 6 carbon atoms, and in many cases derived from ethanol or isopropanol or ethylene or propylene glycol. Examples include mono, di or triethanolamine, or the corresponding isopropanolamines and diglycolamine and morpholine. A further useful class of solvents comprises the ether or ester derivatives and N-alkyl, N-acyl or N-oxide derivatives of the aforementioned alkanolamines. The alkyl/acyl group often contains 1 to 4 carbon atoms. Examples include N-acetyl ethanolamine.

The surfactants which can be employed herein can be non-ionic, anionic, cationic, or amphoteric. Generally, the surfactants contain at least one hydrophobic group, e.g. an aliphatic hydrocarbon group containing at least 8 carbon atoms, and often from 10 to 26 carbon atoms, the aliphatic group often being acyclic, but sometimes containing an alicyclic group, or the hydrophobic group can be an alkaryl group containing at least 6 and preferably up to 18 aliphatic carbon atoms. The surfactant contains in addition at least one water-solubilising group for example a sulphonate, sulphate, or carboxylic group which is linked either directly or indirectly to the hydrophobic group. Linking members can include residues of polyhydric alcohols containing etheric or esteric linkages, for example derived from ethylene glycol, propylene glycol, glycerine or polyether residues. The surfactants can be soap or be synthetic, for example as described in chapter 2 of Synthetic Detergents by A. Davidsohn and B. M. Milwidsky, 6th Edition published in 1978 by George Godwin Limited, and methods of making them are described in chapter 5 of the same book.

Amongst anionic surfactants described on pages 11–23 of the aforementioned book, sulphonates and sulphates are of special practical importance. The sulphonates include, for example, alkaryl sulphonates, and particularly alkyl benzene sulphonates, the alkyl group preferably being a straight chain containing 9 to 15 carbon atoms, of which one of the most commonly employed surfactants is linear dodecyl benzene sulphonate. Other anionic sulphonates which are useful in washing compositions herein include olefin sulphonates, obtained, for example, by sulphonating primary or secondary aliphatic mono-olefins, alkane sulphonates, especially linear alkane sulphonates, and hydroxy alkane sulphonates and disulphonates, especially 3, 4, and 5-hydroxy-n-alkyl sulphonates in which the alkyl group contains any even number from 10 to 24 carbon atoms. Other desirable anionic surfactants include alcohol sulphates, preferably linear, having a chain length of at least 10 carbon atoms and sulphated fatty acid alkanolamides. Other sulphates comprise sulphated nonionic surfactants as for example alkylphenoxy-ethylene oxide ether sulphate in which the alkyl groups contain from about 8 to 12 carbon atoms and there are 1 to 10 units of ethylene oxide in each molecule. Yet other sulphate surfactants comprise alkyl ether sulphates where the alkyl group contains from 10 to 20 carbon atoms, preferably linearly and each molecule contains from 1 to 10 preferably from 1 to 4 molecules or ethylene oxide. Further anionic surfactants include phosphate derivatives of the ethylene oxide based nonionic surfactants described herein.

It is of considerable advantage that at least a proportion of the anionic surfactant be in liquid form or readily liquifiable.

In many suitable classes of anionic surfactants the counter ion is a monovalent metal ion, often a sodium or potassium ion, or a quaternary ammonium cation derived for example from ethanolamine or isopropylamine.

In practice, cationic detergents are normally not present in the same composition as anionic surfactants, but when cationic detergents are used they are frequently quaternary ammonium salts such as tetraalkyl ammonium halides in which at least one of the alkyl group contains at least 10 carbon atoms or quaternary pyridinium salts substituted by an alkyl chain of at least 10 carbon atoms.

A considerable proportion of nonionic surfactants suitable for use in the present invention comprises condensation products of ethylene oxide and possibly propylene oxide. One class of such nonionic surfactants which is of special importance comprises water soluble condensation products of alcohols containing from 8 to 18 carbon atoms with an ethylene oxide polymer often containing at least 5 moles of ethylene oxide per molecule of surfactants, e.g. from 7 to 20 moles of ethylene oxide. Particularly desirable nonionic surfactants comprise water soluble condensates of alkyl phenols or alkyl naphthols with an ethylene oxide polymer normally containing from 5 to 25 moles of ethylene oxide per mole of alkyl phenol or alkyl naphthol. The alkyl group normally contains from 6 to 12 carbon atoms and is frequently linear.

As an alternative to the hydrophobic moiety of the nonionic surfactant being linked to the hydrophilic moiety by an ether link as in alkyl phenol/ethylene oxide condensates, the linkage can be an ester group. The hydrophobic moiety is normally the residue of a straight chain aliphatic acid containing from 8 to 22 carbon atoms and more particularly lauric, stearic and oleic residues. In one class of nonionic ester surfactants, the hydrophilic moiety often comprises polyethylene oxide, frequently in the ratio of from 5 to 30 moles of ethylene oxide per mole of the fatty acid residue. It will be recognised that both mono and di esters can be employed. Alternatively it is possible to employ as the hydrophilic moiety glycerol, thereby producing either mono or di glycerides. In a further group, the hydrophilic moiety comprises sorbitol. A further class of nonionic surfactants comprise alkanolamides which can be obtained when a C10 to C22 amide is condensed with a polyethylene oxide or polypropylene glycol hydrophilic moiety or moieties. Semi-polar detergents include water soluble amine oxides, water soluble phosphine oxides and water soluble sulphur oxides, each containing one alkyl moiety of from 10 to 22 carbon atoms and two short chain moieties selected from the groups of alkyl and hydroxyalkyl groups containing 1 to 3 carbon atoms.

Useful amphoteric surfactants include derivatives of aliphatic quaternary ammonium, sulphonium and phosphonium compounds in which the aliphatic moieties can be linear or branched, or two of which can join to form a cyclic compound, provided that at least one of the constituents comprises or contains a hydrophobic group containing from about 8 to 22 carbon atoms and the compound also contains an anionic ,water solubilising group, often selected from carboxylate, sulphate and sulphonates.

The substantially non-aqueous liquid is typically present in compositions according to the invention at between from about 95% to 50%, the actual level being chosen to suit the desired application. Where one or more surfactants are used in combination with other non-aqueous liquids, the weight ratio of surfactants to other non-aqueous liquids is often in the range from 50:1 to 1:50, usually in the range from 25:1 to 1:25, and more usually in the range from 10:1 to 1:10.

Compositions according to the present invention can incorporate an activator, by which is meant any compound which reacts with hydrogen peroxide or, more usually, the perhydroxide ion to form in situ an organic peroxidic species which is often a peracid. The peracid usually contains up to 30 carbon atoms and may comprise one or more aliphatic, alicyclic or aromatic structural units. The structural units may also comprise one or more heteroatoms, for example, nitrogen. Examples of such activators may be chosen from, but not restricted to, the group comprising carboxylic acid or mixed carboxylic/sulphonic acid anhydrides; gem diesters; enol esters, N-diacylated amines and/or salts of benzenesulphonic acid esters of carboxylic acids. A non-exhaustive and purely illustrative list of activators comprises:

(a1) carboxylic acid or mixed carboxylic acid/sulphonic acid anhydrides such as benzoic anhydride, phthalic anhydride, bis(ethane sulphonic acid), anhydride and benzene sulphonic acid/benzoic acid anhydride.

(a2) enol esters such as vinyl or isopropenyl acetate or benzoate or divinyl adipate.

(a3) gem diesters such as ethylidene or isopropylidene diacetate or dibenzoate, or ethylidene benzoate acetate or heptanoate, or bis(ethylidene acetate) adipate or azelate.

(a4) sugar esters such as glucose pentacetate or lactose octacetate (a5) carbonic acid esters such as alkali metal salts of para(ethoxycarbonyloxy) benzoic acid or para(propyloxy carbonyloxy) benzene sulphonic acid.

(a6) N,N-diacylated amines, such as N,N,N'N'-tetraacetyl (methylene or ethylene) diamine, N,N-diacetylaniline, N,N-diacetylmethylamine or N,N-diacetyl-p-toluidine.

(a7) Diacylated hydantoins such as 1,3-diacetyl-5,5-dimethylhydantoin.

(a8) Acylated glycolurils, such as tetraacetylglycoluril.

(a9) N-alkyl-N-sulphonylcarbonamides, such as the compounds

N-methyl-N-mesylacetamide, N-methyl-N-mesyl-benzamide,

N-methyl-N-mesyl-nitrobenzamide, and

N-methyl-N-mesyl-p-methoxybenzamide.

(a10) N-acylated cyclic hydrazides, acylated thiazoles or urazoles, such as monoacetylmaleic acid hydrazide.

(a11) Diacylated 2,5-diketopiperazines, such as 1,4-diacetyl-2,5-diketopiperazine, 1,4-dipropionyl-2,5-diketopiperazine and 1,4-dipropionyl-3,6-dimethyl-2,5-diketopiperazine.

(a12) Acylation products of propylenediurea or 2,2-dimethylpropylenediurea (2,4,6,8-tetraaza-bicyclo-(3,3,1)-nonane-3,7-dione, or its 9,9-dimethyl derivative, especially the tetraacetyl- or the tetrapropionylpropylenediurea or their dimethyl derivatives.

(a13) O,N,N-trisubstituted hydroxylamines, such as

O-benzoyl-N,N-succinyl-hydroxylamine,

O-acetyl-N,N-succinyl-hydroxylamine,

O-acetyl-N,N-phthaloyl-hydroxylamine,

O-p-methoxybenzoyl-N,N-succinyl-hydroxylamine,

O-p-nitrobenzoyl-N,N-succinyl-hydroxylamine and

O,N, N-triacetylhydroxylamine.

(a14) N,N'-diacyl-sulphurylamides, such as

N,N'-dimethyl-N,N'-diacetyl-sulphurylamide and

N,N'-diethyl-N,N'-dipropionyl-sulphurylamide.

(a15) Sulphonyl halides such as p-(acetyl amino) phenyl sulphonyl chloride.

(a16) Azines such as diisocyanato-s-triazine or a halotriazine.

(a17) N-Sulphonylazoles.

(a18) N-acyl carboxylic imides such as N-acetyl caprolactam, N-acetyl diglycolimide, N-acetyl succinimide and N-acetyl phthalimide.

(a19) Mixed O-acyl, N-acyl compounds such as alpha-acetoxy-alpha-methyl-N,N' -diacetoxymalonamide or O-acetyl-N,N-diacetylethanolamine.

(a20) Salts of benzenesulphonic acid esters of carboxylic acids such as sodium nonanoyloxybenzenesulphonate, sodium benzoyloxybenzenesulphonate or sodium isononanoyloxybenzenesulphonate.

Any mixture of activators can be used. Although it is possible to employ any equivalent mole ratio of activator to superperborate, in many embodiments the mole ratio is within the range 10:1 to 1:10, it is generally advantageous to use a mole ratio closer to 1:1 or to use a substantial excess of the persalt, for example, a mole ratio in the range 2:1 to 1:5, especially 1:1 to 1:5. Typically, activators comprise up to about 20% by weight of the composition.

Other components which may optionally be present in embodiments of the invention may be chosen from the group comprising detergent builders, soil anti-redeposition agents, dye transfer inhibitors, optical brightening agents, peroxygen stabilisers, corrosion inhibitors, bactericides, foam enhancers, foam inhibitors, thickeners, absorbents, abrasives, dyes, perfumes, and enzymes. These optional components other than abrasives typically represent from 0 to 10% w/w of the total formulation. When abrasives are present, they typically provide up to 40% w/w.

Detergent builders which can be employed in compositions according to the invention include both water soluble and water-insoluble builders. Water soluble builders of especial value include alkali metal polyphosphates, pyrophosphates and polymetaphosphates, and in particular the sodium and/or potassium salts, and additionally, the sodium/hydrogen or potassium/hydrogen salts can be used. Other soluble builders include alkali metal borates, silicates and carbonates, again especially the sodium salt. Amongst water-insoluble builders, noteworthy examples are zeolites that obey the formula $(M_2O)_x$ $(Al_2O_3)$ $(SiO_3)_y$, in which M is a monovalent metal, x is 0.7 to 1.5 and y is from 1.3 to 4.0 of which especial value accrues to sodium X, sodium A and mixtures thereof. To achieve a lower wash pH, boric acid may be used.

To some extent, at least proportion of the builders can comprise organic sequestrant-type builders of which suitable classes include aminocarboxylic acids, aminophosphonic acids, polycarboxylic acids and polyhydroxycarboxylic acids, either employed as such in order to promote a somewhat lower washing pH or in salt form. Examples of note include nitrilotriacetic acid (NTA), ethylene diaminetetraacetic acid or the corresponding methylenephosphonic acids, citric acid, gluconic acid, $C_2$ to $C_{10}$ dicarboxylic acids 1,1,3,3-propanetetracarboxylic acid, oxydiacetic acid, oxydisuccinic acid, furan tetracarboxylic acid and tetrahydrofuran tetracarboxylic acid, as such or as their sodium or potassium salt.

The ratio of acidic to salt builders and the total mount of the builders is often so arranged as to generate an alkaline pH, in particular from pH 7.5 to 10.5, in the wash water. When a preformed peroxyacid is used the pH is preferably 7.5 to 8.5 and when a persalt/activator, a pH of 8.5 to 10 is preferable to promote perhydrolysis.

Solid components present in compositions according to the invention typically have a particle size less than 3000 microns, usually between 10 microns and 1000 microns, preferably between 15 microns and 250 microns.

The components to be included in the invention can be present in a wide ratio, but the total solids content preferably comprises no more than about 50% w/w, and is commonly in the range 5 to 45% w/w. Conversely the liquid components normally comprise at least 50% and often 55 to 95% w/w.

The invention compositions can readily be made by blending the components together in appropriate ratios.

Preferably, the non-aqueous liquids are blended together at ambient to 60° C., and then the solids are stirred in until the mixture is homogeneous.

The process of manufacture can be carried out on a small scale using planetary mixers, motor driven propellers, turbines, colloid mills and homogenizers and even using high speed blenders or food processors. Similar types of apparatus can be employed on a plant scale employing for example rotating paddles, rotating simple or complex propellers, turbine-type agitators, colloid mills, homogenizers, or high-frequency ultrasonic emulsifiers. It will be recognised that the liquid phase manufacture and dispersion of the solid phase need not be accomplished in a single stage, but may be carried out in a succession of stages using the same or different types of equipment.

The process for cleansing can be carried out by contacting that which is to be cleaned with a non-aqueous liquid containing a suspension of a superperborate optionally in diluted form, at a temperature ranging from ambient to the boiling point of the liquid or solution. The cleansing method is illustrated by, but is not limited to the following examples. A composition according to this invention can be poured in undiluted form onto a means of distributing the composition, e.g. a kitchen cloth. This is then used at room temperature to wipe the composition over domestic hard surfaces, e.g. work surfaces or floors. The cleaned hard surface can then be further wiped with a damp cloth to remove any remaining traces of the cleaning composition. Alternatively, a composition according to the invention can be diluted to about between 1 and 10% by weight in water at a temperature typically between 10° C. and 80° C. and be distributed using, for example, a mop.

Textile articles can be cleaned by contacting them with an aqueous solution of a composition according to the invention in a number of possible ways. For example, the composition can be applied directly to the article in the area of a particularly severe stain prior to further washing as a spot-treatment, or a composition may be used as an aqueous solution. The aqueous solution may be employed in a hand washing technique where the articles are washed manually in a bowl, sink or other such receptacle, or may be employed in a washing machine. The aqueous solution typically contains between 1 and 15 grammes per litre of the composition according to the invention, often between 3 and 10 grammes per litre. The aqueous solutions can be employed at any temperature between room temperature and the boiling point of the solution, with the temperature often lying in the range from 25° C. to 80° C.

The contact time can vary considerably and will often take into account the temperature of the solution and the means being employed to effect the washing. For example, at 60° C. in an automatic washing machine the contact time will often be between 15 to 30 minutes, whereas at room temperature, it is sometimes expedient to leave the articles to soak overnight in the solution.

It will be appreciated that the applications for compositions according to the invention can vary widely in use conditions, contact times etc. and that the illustrations given above are intended only as a guide to the applicability of the invention.

Having described the invention in general terms, specific embodiments will be described by way of illustration.

Details of all of the components used in the examples, and the abbreviations used in the tables are given below:

PBSX—Sodium superperborate with an Avox of 23.2% with a mole ratio of Na:B of 1:1.

PBS1—Sodium perborate monohydrate.

EHA—Ethylidene heptanoate acetate.

EBA—Ethylidene benzoate acetate.

TAED—N,N,N',N',-tetraacetylethylenediamine.

SNOBS—Sodium nonanoyloxybenzenesulphonate.

CD919—an alcohol ethoxylate with a C9 alkyl chain and an average of 9 moles of ethylene oxide per molecule, available under the trade name Ethylan CD 919.

S87K—a blend of nonionic surfactants available under the trade name Synperonic 87K.

PEG—Polyethylene glycol, molecular weight 200.

GTA—Glycerol Triacetate.

N91-8—an alcohol ethoxylate with a C9 alkyl chain and an average of 8 moles of ethylene oxide per molecule, available under the trade name Neodol 91-8

NaSIL—Sodium Metasilicate.

STPP—Sodium Tripolyphosphate.

CMC—Carboxymethylcellulose.

OBA—Optical Brightener, Tinopal CBS-X.

Examples E1 to E6 and comparisons C1–C6 were prepared at room temperature by mixing together the specified liquid components and then adding, with continued mixing, the solid components. The weight ratios of the components are given in Table 1, where E represents an example according to the present invention, and C represents a comparison not according to the invention. Samples of the formulations were analysed for either or both of perborate and effective activator levels at the commencement of the trial period, stored at 32° C. for 8 to 12 weeks and then re-analysed to determine the recoveries of perborate and/or effective activator. Perborate levels were determined by measuring the Avox of the samples by a standard method comprising titration of the samples in acidic solution with potassium permanganate solution. Activator levels were measured by dissolving a 2 g sample of the composition being analysed in demineralised water at 25° C. and pH 9 with agitation provided by a paddle stirrer. Aliquots of the solution were removed at regular intervals and analysed for peracid by iodometric titration in ice/water/glacial acetic acid with sodium thiosulphate solution. Comparison of the maximum level of peracid reached for the sample with that reached at the commencement of the storage trial allowed the effective activator recovery to be calculated. The results of the trials are given in Table 2. The results for examples and comparisons E1–4 and C1–4 are for storage for 12 weeks, the results for examples and comparisons E5–6 and C5–6 are for storage for 8 weeks.

TABLE 1

Example and Comparison Formulations for Stability Trial

| | Sample Number | | | | | |
|---|---|---|---|---|---|---|
| Component | E1 | C1 | E2 | C2 | E3 | C3 |
| PBSX | 7.5 | — | 7.5 | — | 6.5 | — |
| PBS1 | — | 7.5 | — | 7.5 | — | 10 |
| EHA | — | — | — | — | 15 | 15 |
| EBA | — | — | — | — | — | — |
| TAED | — | — | — | — | — | — |
| SNOBS | — | — | — | — | — | — |
| CD919 | 92.5 | 92.5 | — | — | — | — |
| S87K | — | — | — | — | 78.5 | 75 |
| GTA | — | — | — | — | — | — |
| PEG | — | — | 92.5 | 92.5 | — | — |

| | Sample Number | | | | | |
|---|---|---|---|---|---|---|
| Component | E4 | C4 | E5 | C5 | E6 | C6 |
| PBSX | 9.9 | — | 10 | — | 6.5 | — |

TABLE 1-continued

| | | | | | | |
|---|---|---|---|---|---|---|
| PBS1 | — | 10 | — | 10 | — | 7 |
| EHA | — | — | — | — | — | — |
| EBA | 15 | 15 | — | — | — | — |
| TAED | — | — | 8 | 8 | — | — |
| SNOBS | — | — | — | — | 15 | 15 |
| CD919 | — | — | 82 | 82 | — | — |
| S87K | 75.1 | 75 | — | — | — | — |
| GTA | — | — | — | — | 78.5 | 78 |
| PEG | — | — | — | — | — | — |

TABLE 2

| | Results of Storage Stability Trial | | | | | | | | | | | |
|---|---|---|---|---|---|---|---|---|---|---|---|---|
| | E1 | C1 | E2 | C2 | E3 | C3 | E4 | C4 | E5 | C5 | E6 | C6 |
| % Perborate Recovered | 89 | 64 | 88 | 59 | 87 | 76 | 89 | 80 | 79 | 31 | 94 | 52 |
| % Activator Recovered | — | — | — | — | 76 | 36 | 64 | 61 | — | — | 35 | 0 |

By comparing the results of corresponding examples and comparisons, it can clearly be seen that the compositions according to the invention give greater perborate and activator stability than the comparisons. For example, the PBSX recovery in example E5 is 79% compared to the PBS1 recovery in comparison C5 which is only 31%, and the activator recovery in example E3 is 76% in the presence of PBSX compared to 36% for the same activator in comparison C3 in the presence of PBS1.

Washing process

A liquid detergent composition, example E7, was prepared according to the formulation given in Table 3. The performance of this formulation at washing samples of cotton and polycotton stained with red wine or tea was evaluated in a Philips AWB 098 Automatic washing machine on a 40° C. main wash cycle (cold fill) at natural pH. The performance was compared with that of two liquid detergents which were commercially available in the UK under the trade names Wisk and Ariel. The composition of example E7 was used at 4 g/l, the two commercial compositions being used at 8 g/l. The extent of stain removal was determined by comparing the reflectance of the washed cloth, Rw, with that of the pre-washed, stained cloth, Rs, and that of the unstained cloth, Ru. The measurements were obtained using an Instrumental Colour System "Micromatch" (Trade Mark) reflectance spectrophotomer equipped with a Xenon lamp filtered through a D65 conversion filter to approximate to CIE artificial daylight. Stain Removal, expressed as a percentage, %SR, was calculated using the formula:

$$\%SR=100\times[Rw - Rs]/[Ru - Rs]$$

The results of the washing trials are given in Table 4 below.

TABLE 3

| Formulation of Example E7 | % w/w |
|---|---|
| PBSX | 7.5 |
| EBA | 11.25 |
| STPP | 22.5 |

TABLE 3-continued

| Formulation of Example E7 | % w/w |
|---|---|
| N91-8 | 53.0 |
| NaSIL | 3.75 |
| CMC | 1.0 |
| OBA | 1.0 |

TABLE 4

| Results of Washing Trial | % Stain Removal | | | |
|---|---|---|---|---|
| | Cotton | | Polycotton | |
| | Red Wine | Tea | Red Wine | Tea |
| E7 | 70.6 | 74.9 | 79.9 | 72.9 |
| Wisk | 58.4 | 66.7 | 63.9 | 57.5 |
| Ariel Liquid | 55.6 | 54.7 | 68.9 | 59.3 |

The results given in Table 4 clearly show the excellent performance achievable with compositions according to the invention, the stain removals being between about 8 to 20% greater for Example E7 than for the two commercial detergents.

Perhydrolysis Studies

Samples of sodium perborate monohydrate (PBS1), sodium perborate tetrahydrate (PBS4), and two sodium superperborates (PBSX1 and PBSX2) having Avoxs of 20.9% and 18.2% and Na:B ratios of 0.97:1 and 0.59:1 respectively were perhydrolysed in the presence of EBA and TAED by the method used to determine the activator stabilities described above, except that the pH used was 10.5, and the temperature was 40° C. All samples were dosed to give 120 ppm Avox and a theoretical peracid concentration of 20 ppm. The results of the perhydrolysis trials are given in Table 5 below.

TABLE 5

| Results of Perhydrolysis Tests | | | | |
|---|---|---|---|---|
| Activator Persalt | Peracid concentration (ppm) | | | |
| Time (mins) | PBS1 | PBS4 | PBSX1 | PBSX2 |
| | TAED | | | |
| 3 | 17.6 | 18.6 | 18.5 | 17.8 |
| 10 | 14.1 | 14.0 | 18.0 | 19.0 |
| 20 | 11.4 | 8.5 | 17.5 | 18.0 |
| | EBA | | | |
| 3 | 15.1 | 14.1 | 14.5 | 12.7 |
| 10 | 4.8 | 5.8 | 8.3 | 10.4 |
| 20 | 3.4 | — | 4.0 | 7.4 |

The results in Table 5 show that use of superperborates in conjunction with activators offer, in addition to improved chemical storage stability, the advantage of maintaining a high peracid concentration for an extended period of time compared to equivalent use of conventional perborates. For both PBSX1 and PBSX2, the rate of peracid production is comparable with that for PBS1 and PBS4 for both TAED and EBA, as evidenced by the peracid levels after 3 minutes, but with the superperborates, the concentration of peracid after 20 minutes remains significantly higher than for the conventional perborates.

We claim:

1. A method of cleaning which comprises contacting an object to be cleaned with a liquid composition containing a perborate bleaching system having improved chemical stability comprising a suspension of an alkali metal salt of a superperborate with an available oxygen content of greater than 16.1% by weight in a substantially non-aqueous liquid which optionally comprises one or more surfactants, said composition being either in undiluted or diluted form.

2. A process for cleansing according to claim 1 characterised in that the cleanser is employed at a temperature from ambient to 80° C.

3. A liquid composition containing a perborate bleaching system having improved chemical stability comprising a suspension of an alkali metal salt of a superperborate with an available oxygen content of greater than 16.1% by weight in a substantially non-aqueous liquid which optionally comprises one or more surfactants wherein the said salt of a superperborate comprises up to 50% by weight of the composition.

4. A liquid composition according to claim 3 wherein the superperborate has an available oxygen content between 16.5 and 30% w/w.

5. A liquid composition according to claim 4 wherein the superperborate has an available oxygen content between 17 and 22% w/w.

6. A liquid composition according to any one of claims 3 to 5 wherein the salt of the superperborate is a sodium salt.

7. A liquid composition according to claim 6 wherein the superperborate has a mole ratio of Na:B of between 0.5 to 1.2:1.

8. A liquid composition according to claim 3 wherein the salt of the superperborate comprises from 0.5% to 50% by weight of the composition.

9. A liquid composition according to claim 8 wherein the salt of the superperborate comprises from 2% to 30% by weight of the composition.

10. A liquid composition according to claim 3 wherein the substantially non-aqueous liquid comprises 50 to 95% by weight of the composition and comprises at least one component selected from the group consisting of alcohols, polyols, polymers of polyols, alkanolamines, ether and ester derivatives of polyols, alcohols and alkanolamines, N-alkyl, N-acyl and N-oxide derivatives of alkanolamines and surfactants.

11. A liquid composition according to claim 3 wherein the substantially non-aqueous liquid comprises 50 to 95% by weight of the composition and comprises at least one component selected from the group consisting of glycerol triacetate, poly ethylene glycol with a molecular weight of 200, and nonionic surfactants.

12. A liquid composition according to claim 3 which contains an activator in a mole ratio to superperborate of from 10:1 to 1:10.

13. A liquid composition according to claim 12 wherein the activator to superperborate mole ratio is between 2:1 to 1:5.

14. A liquid composition according to claim 13 wherein the activator to perborate mole ratio is between 1:1 to 1:5.

15. A liquid composition according to any one of claims 12 to 14 wherein the activator is selected from the group consisting of gem diesters, enol esters, N,N'-diacylated amines and salts of benzenesulphonic acid esters of carboxylic acids.

16. A liquid composition according to claim 15 wherein the activator is selected from ethylidene benzoate acetate, ethylidene heptanoate acetate, N,N,N',N'-tetraacetylethylenediamine and sodium nonanoyloxybenzenesulphonate.

17. A liquid composition according to claim 3 which comprises up to 40% by weight of at least one member selected from the group consisting of detergent builders, soil anti-redeposition agents, dye transfer inhibitors, optical brightening agents, peroxygen stabilisers, corrosion inhibitors, bactericides, foam enhancers, foam inhibitors, thickeners, absorbents, abrasives, diluents, dyes, perfumes, and enzymes.

18. A liquid composition according to claim 3 wherein any suspended solid components have a particle size less than 3000 microns.

19. A liquid composition according to claim 18 wherein any suspended solid components have a particle size between 10 microns and 1000 microns.

20. A liquid composition according to claim 19 wherein any suspended solid components have a particle size between 15 microns and 250 microns.

21. A method of preparing liquid compositions containing a perborate bleaching system by suspending an alkali metal salt of a superperborate with an available oxygen content of greater than 16.1% by weight in a substantially non-aqueous liquid by stirring or otherwise agitating wherein the said salt of a superperborate comprises up to 50% by weight of the composition.

22. A method according to claim 21 wherein the step of suspending comprises agitating.

23. A method according to claim 21 wherein the step of suspending comprises stirring.

* * * * *